F. J. Austin.
Paper Cutting Mach.
No. 218. Reissued Jun. 22, 1852.
Fig. 1.
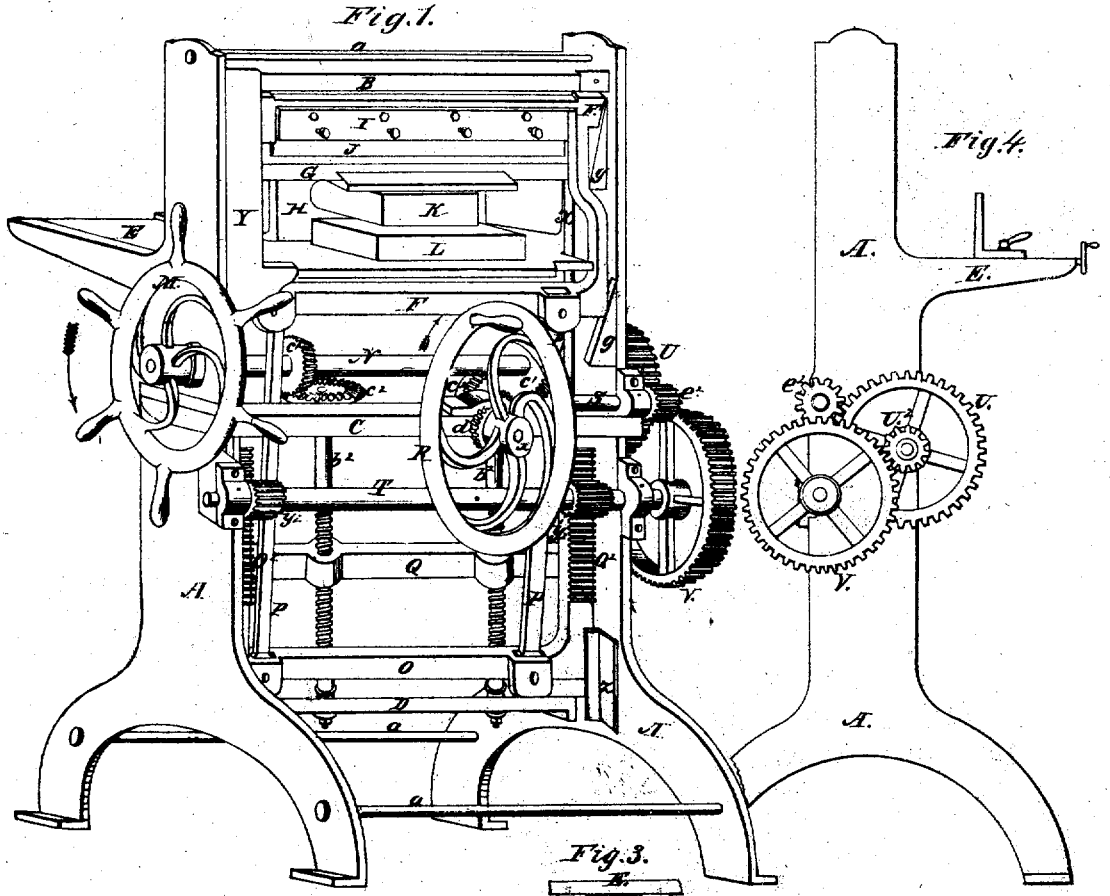
Fig. 4.
Fig. 2.
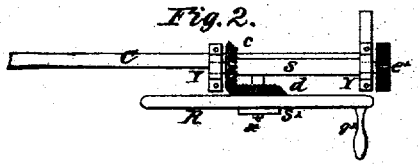
Fig. 3.
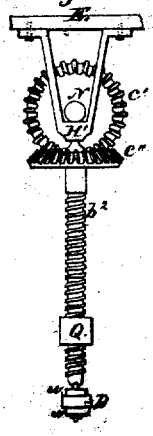

UNITED STATES PATENT OFFICE.

FREDERICK J. AUSTIN, OF NEW YORK, N. Y.

MACHINE FOR TRIMMING THE EDGES OF BOOKS, CUTTING PAPER, &c.

Specification forming part of Letters Patent No. 2,134, dated June 16, 1841; Antedated December 16, 1840; Reissued June 22, 1852, No. 218.

*To all whom it may concern:*

Be it known that I, FREDERICK J. AUSTIN, of the city, county, and State of New York, have invented a new and useful Improvement in Machines for Trimming the Edges of Books, Cutting Paper, &c.; and I do hereby declare the following to be a full and exact description thereof.

The nature of my invention consists in giving the knife a lateral or end vibratory motion at the same time that it is forced down parallel to the bed plate on which the books or paper is laid to be cut, by which means the whole cutting edge is presented to the mass at the same time, and by the slight vibratory motion endwise the edge of the knife is relieved and the paper cut more smoothly and with less labor than is required in the ordinary machines where the vibratory motion of the knife is not used.

To enable others skilled in the art to make and use my invention I will proceed to describe its construction and operation reference being had to the drawings which accompany and make a part of this specification.

The frame or machine itself may be made of any material suitable for such purposes cast iron however is preferable. The ends or sides of the machine A A are two upright pieces spreading at the bottom to form the feet and an arm projecting back to support the back plate or table E. The sides A A are connected together at the bottom by the cross pieces D fastened to the sides with bolts and the collar rods A A and at the middle by the bed plate E the bolts passing through the sides and screwing into the plate; and at the top by the brace B and the bolt *a*,—on the inside of each of the sides are cast flanges or ribs to form the guides to the gate or frame to which the knife is bolted, the upper part of this frame is marked I and the lower part F, its ends passing through notches cut in the bed plate. On the ends of this frame are formed cans as seen at F′, and on the sides A A are screwed corresponding cams *g g*. Two front plates are fitted and bolted to the front edges of the sides and bed plate to keep the frame in its place one of which is marked Y and the other is left out in the drawing in order to show the cams. In the lower part of the machine is another machine marked O which extends across the machine its ends $o^2$ $o^2$ reaching upward on which are formed teeth into which the pinions $y^2$ $y^2$ engage. This frame slides in grooves or between flanges cast on the sides A A as at Z and is connected to the frame F by the straps P, P. These straps are fastened by means of pins or bolts fitted so that they can oscillate or swing freely that when the frame *o*, is made or lowered by the action of the pinions $y^2$ $y^2$ as hereafter described it will carry the frame F up and down with it, and these straps (P P) working on their centers allow the frame F to be governed by the cams F′, *g* which produces the lateral or end vibratory motion of the knife.

Letter T is a shaft extending across the front of the machine its boxes are formed on the edges of the sides. On this shaft is fitted the pinions $y^2$ $y^2$ so as to work into the racks $o^2$ $o^2$ on O and on the end of it the cog wheel V is fitted and keyed fast.

Letter *c* is a cast iron bar extending across the front of the machine and bolted at the two ends, the object of which is to support the fly wheel R and the shaft S. This wheel R is fitted on the hub of the bevel pinion *d* which is made to project on its back for the purpose (as represented in Fig. 2) and keyed part to its (the hub) $S^2$ is a stud or pin made part to C on which the pinion *d* is fitted so that it can revolve freely, but kept from coming off by the nut X. On the top edge of C is secured a shaft having at one end a bevel pinion C to work into the pinion *d* and at the outer end a pinion $e^2$ to work into the cog wheel U on the end of the shaft N and on which outside the cog wheel U is also a pinion wheel $U^2$ (see Fig. 4) working into the cog wheel V on the end of the shaft T so that when the fly wheel R is turned around by the handle $g^2$, it carries *d* which engages in C and turns the shaft S as also the pinion $e^2$ which engage in U which by means of a pinion $U^2$ as represented in Fig. 4 react on V and through it the pinions $y^2$ $y^2$ and thus forces down the knife J which is bolted to the frame F.

There is also a press attached to the machine for holding the books or papers firm while the cutting operation is being performed. This press consists of two screws $b^2$ $b^2$ which work in female screws cut in the cast iron piece *g* and are supported at the lower ends by the center pins which pass through D and are fastened by means of the adjusting nuts W W as seen in Fig. 3 the upper ends working in sockets or holes drilled in the end of the hangers H′ which are made to straddle the shaft N and is bolted to the under side of the bed plate E. The piece Q has grooves cut in its ends which correspond to the ribs cast on the sides A A which serve as guides for it as it moves up and down on the screws. From each end of Q is a rod of round iron passing up through the bed plate one of which is seen at X. The rods are connected at the top to the piece G which is also cast iron and guided at the end by ribs N is a shaft passing through the center of the machine and directly over the centers of the screws $b^2$ $b^2$. On this shaft N are two bevel pinions C′ C′. These pinions work into corresponding pinions $C^2$ $C^2$ on the top ends of the screws $b^2$ $b^2$. The shaft N passes through the left side of the machine and has the fly wheel M fastened thereto. By turning the fly wheel, the screws $b^2$ $b^2$ are made to revolve by the action of the pinions C′ $C^2$ and these screws being held firm from moving endwise, the piece Q moves up and down on them and this piece being connected to the piece G by the rods X carries it with it and thus presses the books which may be represented by K.

Letter L is a cutting board on which the book or paper rests to protect the edge of the knife from cutting on the platen of the press.

Letter H is a gage made to slide on the bed plate and held by a bolt and nut so as to give the required size to the book.

In operating the machine the knife having been run up and also the press G the books or paper (as K) is placed upon the board L and pressed by the hand against the gage H, the wheel M is then turned in the direction of the arrow which turns the screws $b^2$ $b^2$ which force down Q and with it my means of the rods X the top of the press G and thus presses the books very firmly, the operator then applies his hand to the wheel R and turns it also in the direction of the arrow which carries the pinion $d$ with it and through the medium of the gear $e^2$, $u$ and $u^2$ and V the pinions $y^2$ $y^2$ act upon the racks $o^2$, $o^2$ and force down the piece O, this piece being connected to the gate or frame F by the straps P P, draws it down also and the knife J being bolted to the frame as at I turns the edges of the books or paper and the cams F′ sliding down on the cams $g$ forces the knife endwise which produces a vibrating motion and thereby causes it to cut the paper smoother and cleaner (or free from turning the edges over) and with much less labor than would be required to cut the paper were no lateral and vibratory endwise motion given to it and which constitutes the essential features of my invention when the knife has done its duty, the books or paper is released from under it, by drawing back the parts and then the machine is ready for a second operation.

What I claim as my invention is—

1. The use of a knife having a lateral or end vibratory motion for the purpose of cutting the edges of books, papers, &c., and its combination with the frame F and rods P P or either of them and operated by cams or other equivalent devices to give a drawing and vibratory cutting action to the knife substantially as set forth.

2. I claim also the mechanical construction of the press as arranged and combined with the parts for cutting and pressing thereby forming an entire machine for the purpose described.

FREDERICK J. AUSTIN.

Witnesses:
CHARLES L. BARRITT,
GEORGE MIDDLETON.

[FIRST PRINTED 1911.]